United States Patent Office 2,883,377
Patented Apr. 21, 1959

2,883,377

PRODUCTION OF LACTAMS FROM OXIME HYDROCHLORIDES

Otto von Schickh and Horst Metzger, Ludwigshafen, (Rhine), Germany, assignors to Badische Anilin- & Soda-Fabrik Aktiengesellschaft, Ludwigshafen (Rhine), Germany No Drawing. Application May 14, 1957
Serial No. 658,935

Claims priority, application Germany June 2, 1956

6 Claims. (Cl. 260—239.3)

This invention relates to a process for the production of lactams from oxime hydrochlorides by the action of sulfuric acid or oleum. In particular it relates to a process for the production of lactams from oxime hydrochlorides having a ring member number of 5 to 10 carbon atoms.

It is known that oximes of cyclic nature can be rearranged into the corresponding lactams. This is usually effected by treatment of the oximes with sulfuric acid or with acid chlorides, as for example phosphorus pentachloride or chlorsulfonic acid.

We have now found that lactams can be obtained with advantage from cycloaliphatic ketoximes by allowing sulfuric acid or oleum to act on the hydrochlorides of the oximes. For example the hydrogen chloride may first be driven off from the oxime hydrochloride with cold sulfuric acid and the mixture then heated to the rearrangement temperature. A preferred embodiment of the process consists in gradually introducing the oxime hydrochloride into a sulfuric acid or a mixture of sulfuric acid and lactam which has been preheated to the rearrangement temperature for example to 80 to 170° C., preferably 100 to 120° C., the disengagement of the hydrogen chloride and the rearrangement to the lactam thereby proceeding simultaneously.

The rearrangement is a strongly exothermic reaction which in many cases commences suddenly and violently after a long induction period. This uncertainty in technical operation can be avoided by adding a certain amount of lactam, for example to the sulfuric acid or to the oleum, to initiate the reaction. It is preferable to use the lactam which is to be formed by the rearrangement. 1 to 20% of lactam, with reference to the mixture to be reacted, is sufficient in order immediately to initiate the rearrangement, for example by batchwise introduction of an oxime hydrochloride into a mixture of sulfuric acid or oleum and lactam, and to ensure complete safety in operation.

When the reaction has ended, the reaction mixture is poured onto ice and the acid solution neutralized with alkaline-reacting substances. It is preferable to use aqueous solutions of alkali metal or alkaline earth metal hydroxides, for example an about 50% caustic soda solution. It is possible however to use a concentrated aqueous solution of ammonia or gaseous ammonia. The crude lactam formed is purified by distillation.

For the rearrangement there is used a highly concentrated 80 to 100% sulfuric acid in which up to 50% of its weight of additional sulfur trioxide may be dissolved. For example there may be used the usual technical 100% sulfuric acid, also called monohydrate, or a 24% oleum, i.e. a 100% sulfuric acid in which an additional 24% of its weight of sulfur trioxide has been dissolved. The temperatures necessary for the rearrangement lie between 80 and 170° C., advantageously 100 to 120° C. The hydrogen chloride set free quantitatively can be used in another way, for example for the production of the oxime hydrochloride.

According to the present process there may be rearranged not only the usually crystallized hydrochlorides of cycloaliphatic oximes, which contain 1 mol of hydrogen chloride to 1 mol of oxime, but also the liquid hydrochlorides of oily nature which form from the crystalline hydrochlorides when these are further treated with hydrogenchloride and which contain more than 1 mol of hydrogen chloride, for example 1.5 to 1.9 up to a maximum of 2.0 mols thereof, to 1 mol of oxime, for example the hydrochlorides of cyclopentanone oxime, cyclohexanone oxime, methylcyclohexanone oxime, cycloheptanone oxime, cyclooctanone oxime and cyclodecanone oxime.

It is a special advantage of the process according to this invention that the hydrochlorides of the oximes can be directly used instead of the free oximes, so that the neutralization, separation and drying otherwise necessary is avoided. In this way the raw material basis for the production of lactams is also considerably widened. A further advantage of the process consists in the substantially simplified temperature control as compared with the usual rearrangement of free cycloaliphatic ketoximes with sulfuric acid, oleum or acid chlorides, in which the considerable rearrangement heat which occurs must be led away. In the process according to this invention, by suitable addition of the oxime hydrochloride, the reaction temperature can be controlled, without external cooling or heating, so that it remains within the desired range because by the disengagement of the hydrogen chloride from the oxime hydrochloride with sulfuric acid, a great part of the amount of heat set free by the rearrangement to lactam is withdrawn from the reaction mixture.

The process can be carried out both in a batchwise and in a continuous manner.

The process is suitable for the production of lactams of omega-aminocarboxylic acids, which are valuable intermediate products for the production of synthetic fibres.

The following examples will further illustrate this invention but the invention is not restricted to these examples. The parts specified in the examples are parts by weight.

*Example 1*

140 parts of 80% sulfuric acid are poured over 14 parts of crystallized cyclooctanone oxime hydrochloride (corresponding to 11.2 parts of the free oxime) at room temperature; about 2.8 parts of hydrogen chloride gas thereby escape with cooling. After the end of the evolution of gas, the whole is carefully heated to 110° C. until the rearrangement reaction commences and the reaction temperature is kept at 115 to 125° C. by corresponding cooling. When the rearrangement has ended, the whole is allowed to cool and the reaction mixture is poured onto ice and neutralized with 50% caustic soda solution. The crude lactam thereby deposited is separated and distilled. After distilling off the water in vacuo, 9.6 parts of practically colorless omega-caprylic lactam of the melting point 75° C. are obtained at the boiling point 114 to 115° C. at 0.4 Torr.

By shaking the neutral aqueous phase with ethylene chloride, a further amount of caprylic lactam is obtained. The yield is 86% of the theoretical yield.

In an analogous way, 34 parts of omega-caprylic lactam of the melting point 76° C. (yield 87% of the theoretical yield) are obtained from 60 parts of liquid cyclooctanone oxime hydrochloride (corresponding to 39 parts of free oxime) which contains about 1 further mol of hydrogen chloride, with 220 parts of 80% sulfuric acid.

Example 2

225 parts of liquid cyclooctanone oxime hydrochloride (corresponding to 150 parts of free oxime) which contains about a further 0.9 mol of hydrogen chloride per mol of oxime hydrochloride, are allowed to flow while stirring into a solution, preheated to 110 to 120° C., of 30 parts of omega-caprylic lactam in a mixture of 58.5 parts of sulfuric acid (100%) and 1.5 parts of oleum (24%). At the same time a mixture of 218.5 parts of sulfuric acid (100%) and 6.5 parts of oleum (24% is is added. The inflow of the reactants is regulated so that the reaction temperature remains between 115 and 125° C. The hydrogen chloride which escapes practically quantitatively can be used again.

When the reaction is ended, the reaction mixture is allowed to cool and poured onto 200 parts of ice, ammonia is led in to neutralize the sulfuric acid and the whole further worked up as described in Example 1. 163 parts of practically colorless omega-caprylic lactam of the melting point 75° C. are obtained. The yield is 89% of the theoretical yield.

Instead of the above mixture of sulfuric acid and oleum, the rearrangement can also be carried out in 10% oleum.

Example 3

134 parts of crystalline cyclooctanone oxime hydrochloride (corresponding to 106 parts of free oxime) are introduced gradually while stirring into a solution, preheated to 110 to 120° C., of 30 parts of omega caprylic lactam in a mixture of 58.5 parts of sulfuric acid (100%) and 1.5 parts of oleum (24%). At the same time a mixture of 1254.5 parts of sulfuric acid (100%) and 4.5 parts of oleum (24%) are allowed to flow in. The supply of the reactants is regulated so that the reaction temperature remains between 105 and 120° C. 22 parts of hydrogen chloride escape. After the reaction has ended the whole is allowed to cool and poured onto 200 parts of ice. It is worked up as in Example 1 and at a boiling point of 114 to 116° C. at 0.4 Torr. there are obtained 122 parts of colorless omega-caprylic lactam of the melting point 75° C. The yield is 87% of the theoretical yield.

Example 4

30 parts of omega-caprolactam are added while stirring to 60 parts of a mixture of 233 parts of sulfuric acid (100%) and 7 parts of oleum (24%); the temperature thereby rises to about 110° C.; 184 parts of liquid cyclohexanone oxime hydrochloride (corresponding to 120 parts of free oxime) which contains about 0.7 mol of further hydrogen chloride per mol of oxime hydrochloride (total HCl content 35%) is then immediately added and at the same time the remaining 180 parts of the above mixture of sulfuric acid and oleum are allowed to flow in in such a way that the reaction temperature remains between 115 and 125° C. About 63 parts of hydrogen chloride escape. After the reaction has ended, it is cooled, poured onto 200 parts of ice and worked up as described in Example 1. At the boiling point 135° C. at 10 Torr. there are obtained 142 parts of omega-caprolactam of the melting point 70° C. The yield is 93% of the theoretical yield.

Instead of the above mixture of sulfuric acid and oleum there can also be used for example a mixture of 60 parts of sulfuric acid (100%) and 175 parts of oleum (24%). The yield is then 95% of the theoretical yield.

Example 5

30 parts of omega-caprolactam are added while stirring to 60 parts of a mixture of 131 parts of sulfuric acid (100%) and 4 parts of oleum (24%). Then at about 115 to 125° C. there are added 85 parts of crystalline cyclohexanone oxime hydrochloride (corresponding to 64 parts of free oxime) and at the same time the remaining part of the mixture of sulfuric acid and oleum so that the reaction temperature remains between 115 and 125° C. About 20 parts of hydrogen chloride escape. After the reaction has ended the whole is cooled, poured onto 200 parts of ice and neutralized by leading in ammonia. The neutralized reaction mixture is worked up as described in Example 1. At the boiling point 135° C. at 10 Torr. there are obtained 89 parts of colorless omega-caprolactam of the melting point 70° C. The yield is 92% of the theoretical yield.

Example 6

135 parts of crystalline cyclopentanone oxime hydrochloride (corresponding to 99 parts of free oxime) are gradually introduced while stirring into a solution, heated to 110 to 120° C., of 20 parts of omega valerolactam in a mixture of 55 parts of sulfuric acid (100%) and 4 parts of oleum (24%). At the same time 155 parts of sulfuric acid (100%) are allowed to flow in. The supply of the reactants is regulated so that the reaction temperature remains between 110 and 125° C. 35 parts of hydrogen chloride escape. After the reaction has ended, it is allowed to cool and poured onto 200 parts of ice. It is worked up as in Example 1 and at a boiling point of 137° C. at 14 Torr. there are obtained 110 parts of colorless omega-valerolactam of the melting point 40° C. The yield is 91% of the theoretical yield.

Example 7

193 parts of liquid cycloheptanone oxime hydrochloride (corresponding to 127 parts of free oxime) which contains per mol of oxime hydrochloride about a further 0.8 mol of hydrogen chloride are allowed to flow while stirring into a solution, preheated to 110 to 120° C., of 20 parts of omega-oenantholactam in a mixture of 59 parts of sulfuric acid (100%) and 1 part of oleum (24%). At the same time there is added a mixture of 220 parts of sulfuric acid (100%) and 5 parts of oleum (24%) and the supply of the reactants is regulated so that the reaction temperature remains between 110 and 130° C. The hydrogen chloride escaping practically quantitatively can be collected and used for some other purpose.

After the reaction has ended, it is allowed to cool and the reaction mixture is poured onto 200 parts of ice and ammonia gas is led in to neutralize the sulfuric acid and the product is worked up as described in Example 1. 135 parts of colorless omega-oenantholactam of the boiling point 143° C. at 8 Torr. and melting point 29° C. are thus obtained.

Example 8

225 parts of liquid cyclooctanone oxime hydrochloride (corresponding to 150 parts of free oxime) which contains per mol of oxime hydrochloride about 0.9 mol further hydrogen chloride are allowed to flow while stirring into a mixture, preheated to 110 to 120° C., of 59 parts of sulfuric acid (100%) and 1.5 parts of oleum (24%). The oxime hydrochloride is initially added slowly until the initiation of the reaction becomes evident by slight heating up. Then there are added simultaneously with further oxime hydrochloride a mixture of 218.5 parts of sulfuric acid (100%) and 6.5 parts of oleum (24%) and the inflow of the reactants is regulated so that the reaction temperature remains between 115 and 125° C.

The whole is further worked up as described in Examples 1 and 2 and 134 parts of colorless omega-capyrlic lactam of the boiling point 114 to 116° C. at 0.4 Torr. and melting point 75° C. are thus obtained. The yield is 89% of the theoretical yield.

Example 9

23 parts of liquid cyclodecanone oxime hydrochloride (corresponding to 17 parts of free oxime) which contains per mol of oxime hydrochloride about 0.7 mol of further hydrogen chloride are allowed to flow while stirring into a solution, preheated to 110 to 120° C., of 5 parts of omega-capric lactam in a mixture of 6 parts of sulfuric acid (100%) and 0.5 part of oleum (24%). At the same time 22 parts of sulfuric acid (100%) are added. The inflow of the reactants is regulated so that the reaction temperature remains between 110 and 130° C. The hydrogen chloride escaping practically quantitatively can be used again.

After the reaction has ended, it is allowed to cool, the reaction mixture poured onto 20 parts of ice, neutralized with ammonia and extracted exhaustively with ether. After distilling off the ether, 21 parts of omega-capric lactam are obtained. After recrystallization from methanol it has a melting point of 162° C. The yield is 95% of the theoretical yield.

We claim:

1. A process for the production of lactams which comprises heating a hydrochloride of a cycloaliphatic ketoxime selected from the group consisting of cyclo heptanone oxime, cyclooctanone oxime and cyclodecanone oxime for rearrangement at 80° C. to 170° C. in 80 to 100% sulfuric acid with up to 50% free sulfur trioxide dissolved therein.

2. A process as claimed in claim 1 wherein the rearrangement is initiated by introducing the reactant hydrochloride of a cycloaliphatic ketoxime into the sulfuric acid which also contains as initiator from 1 to 20% by weight with reference to said reactant of the lactam to be formed by the rearrangement.

3. A process for the production of lactams which comprises heating a liquid hydrochloride of a cycloaliphatic ketoxime selected from the group consisting of cycloheptanone oxime, cyclooctanone oxime and cyclodecanone oxime for rearrangement at 80° to 170° C. in 80 to 100% sulfuric acid with up to 50% free sulfur trioxide dissolved therein, said liquid hydrochloride of the cycloaliphatic ketoxime having more than 1 mol to a maximum of 2 mols HCl per mol of ketoxime.

4. A process as claimed in claim 3 wherein said liquid hydrochloride of a cycloaliphatic ketoxime contains from 1.5 to 2 mols HCl per mol of ketoxime.

5. A process for the production of omega-caprylic lactam which comprises introducing liquid cyclooctanone oxime hydrochloride containing from 1.5 to 2 mols HCl per mol of ketoxime into 80 to 100% sulfuric acid with up to 50% free sulfur trioxide dissolved therein, said sulfuric acid containing 1 to 20% of omega-caprylic lactam, and heating the resulting mixture at 80° C. to 170° C.

6. A process for the production of omega-caprylic lactam which comprises introducing crystallized cyclooctanone oxime hydrochloride containing 1 mol of HCl to 1 mol of ketoxime into 80 to 100% sulfuric acid with up to 50% free sulfur trioxide dissolved therein, said sulfuric acid containing 1 to 20% of omega-caprylic lactam, and heating the resulting mixture at 80° C. to 170° C.

References Cited in the file of this patent

UNITED STATES PATENTS

| | | |
|---|---|---|
| 2,351,381 | Wiest | June 13, 1944 |
| 2,797,216 | Wagner et al. | June 25, 1957 |

UNITED STATES PATENT OFFICE
CERTIFICATE OF CORRECTION

Patent No. 2,883,377 April 21, 1959

Otto von Schickh et al.

It is hereby certified that error appears in the printed specification of the above numbered patent requiring correction and that the said Letters Patent should read as corrected below.

Column 2, line 62, for "115° C." read -- 116° C. --; column 3, line 10, for "(24% is" read -- (24%) --; line 32, for "1254.5" read -- 154.5 --.

Signed and sealed this 29th day of September 1959.

(SEAL)
Attest:

KARL H. AXLINE
Attesting Officer

ROBERT C. WATSON
Commissioner of Patents